July 5, 1927.
T. L. JOHNSON
1,635,085
CONVEYER CHAIN FOR COAL LOADING MACHINES
Filed June 9, 1926 2 Sheets-Sheet 1
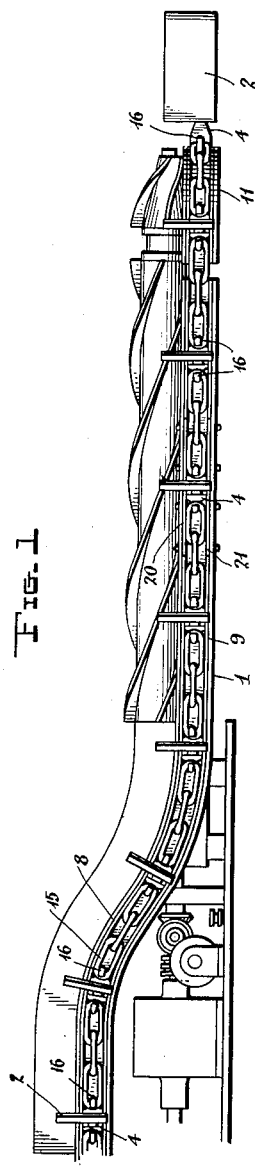
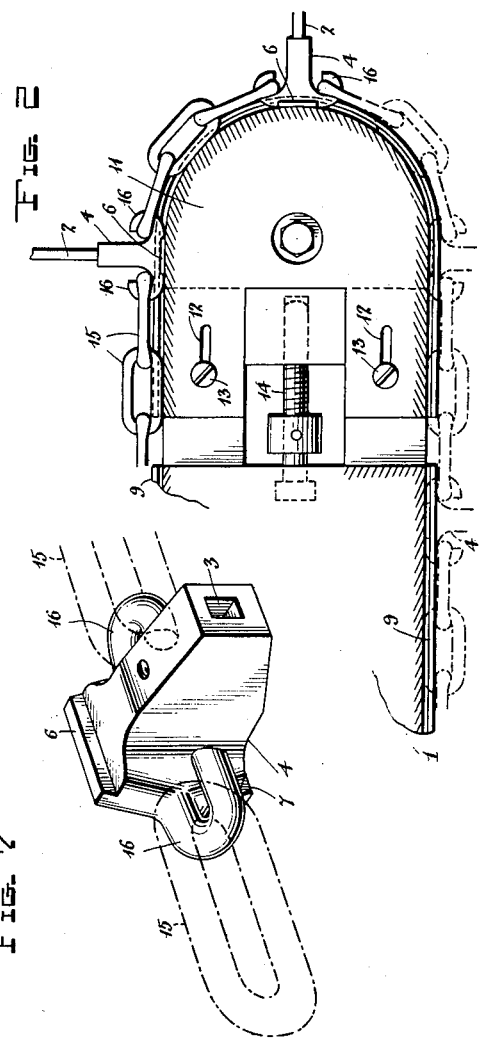
Inventor
Thomas L. Johnson,
By
Attorney

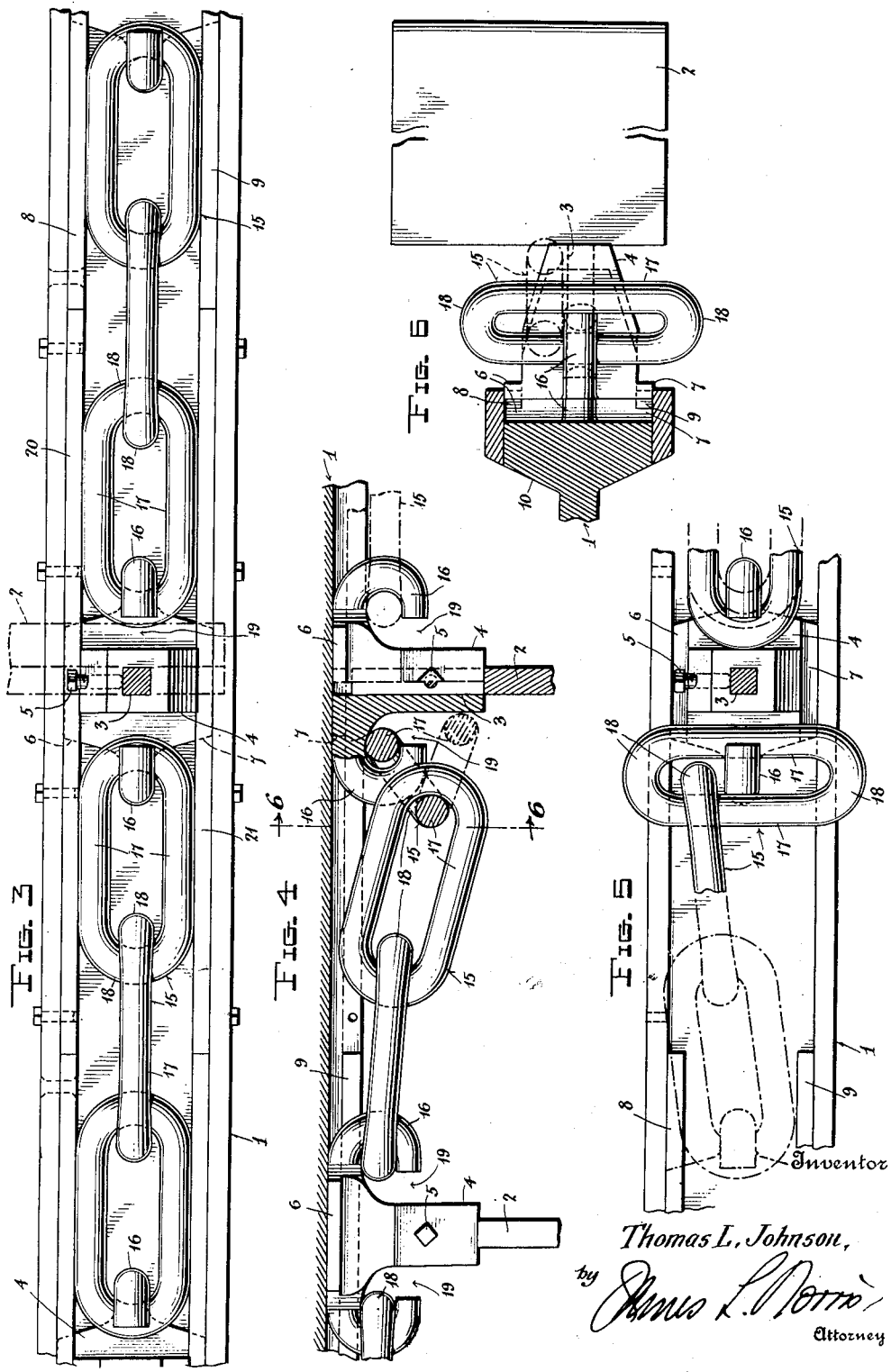

Patented July 5, 1927.

1,635,085

UNITED STATES PATENT OFFICE.

THOMAS L. JOHNSON, OF CHARLESTON, WEST VIRGINIA.

CONVEYER CHAIN FOR COAL-LOADING MACHINES.

Application filed June 9, 1926. Serial No. 114,773.

This invention relates to conveyer chains and particularly to endless chains of the class described adapted to carry lateral flights and to work in angularly related planes.

One of the objects of the invention is to construct a chain having quick detachable links which can be readily taken apart for replacement or repairs.

Another object of the invention is to construct a chain having detachable links and which cannot be taken apart while the chain is in operative position, and particularly designed positively to keep the links in engagement at the point where the chain passes from one plane to an angularly related plane.

More specifically, the invention has for its object the construction of a conveyer chain having the above described attributes, and which is best adapted to use with the coal loading machine forming the subject matter of my pending application Serial No. 91,157, filed February 27, 1926.

In the drawings:—

Figure 1 is a side elevation of part of a coal loading machine embodying my novel conveyer chain.

Figure 2 is a plan view of one end of the coal loading machine showing the means by which the conveyer bed may be shortened to loosen the chain.

Figure 3 is a side elevation of a portion of the flanged runway in which the conveyer chain travels.

Figure 4 is a horizontal section through a portion of the runway showing the conveyer chain in the position assumed for the removal of a link.

Figure 5 is a side elevation of a portion of the chain and runway showing the parts in the same position as in Figure 4.

Figure 6 is a section taken along the line 6—6 of Figure 4.

Figure 7 is a perspective view showing one of the flight-carrying links in full lines, operative positions of the adjacent links being shown in dotted lines.

Referring now in detail to the several figures, the numeral 1 represents the bed plate of the coal loading machine shown in my aforementioned application, which bed plate extends out on one side of the coal loader to form a chute or floor against which the flights 2 of the conveyer slide. Each of said flights is removably carried in the socket 3 of a specially formed link 4, a set screw or other desirable means 5 being employed to hold the flight in position. The link 4 is provided with upper and lower flanges 6 and 7, said flanges fitting behind beads 8 and 9 at the outer edges of a channeled member 10, the latter together with said beads forming a runway or guide which extends around the conveyer bed, defining the path of the conveyer chain and retaining the latter against displacement.

For the purpose of adjusting the tension of the chain, and particularly in order to slacken it so that a certain link or links may be removed therefrom for the purpose of replacement or repair, the end 11 of the conveyer bed is made adjustable longitudinally with respect to the remainder of the bed, the adjusting means consisting of slots 12 formed in said end member through which project screws 13 engaging the main part of the bed, a screw bolt 14 being mounted in a recess between said bed members, threadedly engaging one bed member and having its head seated in a socket formed in the other bed member, and which may be turned to move said members towards or away from one another. The amount of adjustment between said bed members must be sufficient to permit the chain to assume the position shown in Figure 5, when it is desired to take the chain apart. The conveyer chain proper consists of the special flight-carrying links 4 alternating with one or more plain links 15. The flight-carrying links are each provided laterally with open hooks 16 interengageable with the adjacent plain links.

Said plain links are preferably designed, as is usual, of a greater length than width dimension. The long sides 17 of said plain links are made of the proper diameter to pass through the spaces 19 at the open ends of the hooks 16. The end portions 18 of said links are, however, made of so large a diameter that they cannot pass through the openings 19. Therefore, in order to remove a plain link 15 from the hooked end 16 of one of the flight carrying links, it is necessary to stand the plain link on end so that its side portion 17 can pass through the space 19. When the link is in its normal position it is obviously impossible for the plain and flight-carrying links to become detached.

It will be noted in Figure 1 that the runway for the conveyer chain is horizontal for a portion of its length and then follows a plane which is inclined to the horizontal. When the conveyer chain reaches this point the links assume a relatively inclined position so that, in order to safeguard the links against coming apart where the chain changes its direction of travel, the curved ends of the plain links which interlock with the flight-carrying links are made of enlarged diameter throughout at least a semi-circular arc as shown in Figure 4.

It has been previously stated as being necessary to cause the links to assume the position shown in Figure 5 before a plain link can be detached from adjacent flight-carrying link. This requires that the chain be shortened a distance equal to the difference between the long and short axes of the plain link, which necessitates that the end 11 of the bed plate be retractable toward the main portion of the bed plate at least one-half this distance. It will be observed, moreover, from Figure 4 that the sides of the plain links come approximately into the vertical plane of the forward edges of the beads 8 and 9 so that some difficulty might be experienced from binding of the chain against the beads when it is attempted to have the chain assume the position shown in Figures 4 and 5. In anticipation of this difficulty and also in order that the flight-carrying links 4 may be removed from the runway, I have provided both the upper and lower beads with detachable sections 20 and 21, which may be taken out upon occasion to facilitate manipulation of the chain, it being understood that the chain is revolved until the part to be detached comes within the zone of the detachable sections.

Since the present invention essentially prescribes that the plain link interengaging with the open-hooked end of the flight-carrying link shall be too large in diameter at its ends to pass through the space provided at said hooked end, but of such diameter that its sides may readily pass through said space when said link is turned in a position perpendicular to the direction of movement of the chain, not only can repairs or replacement be quickly and economically made when required, but when the conveyer chain is in normal operative position it is mechanically impossible for any of the links to become disconnected.

While I have in the above description disclosed what I believe to be a preferred and practical embodiment of my invention, it is to be understood that the specific details described are not limitative in their effect upon the invention but merely illustrative except in so far as they are expressly prescribed by the terms of the appended claim.

Having described my invention what I claim as new and desire to secure by Letters Patent, is:—

In a conveyer, a guideway for a conveyer chain, said guideway being provided with beads, and said chain being provided with certain links having flanges travelling behind said beads whereby said chain is retained in place, said chain having interlocking links constructed to be detached after one of said links is turned substantially at right angles to its normal position, means for shortening said guideway to permit turning of said link, said beads being discontinuous in a certain zone in said guideway, into which zone said link may be brought by revolving said chain, to permit turning of said link preparatory to detachment of the same.

In testimony whereof I have hereunto set my hand.

THOMAS L. JOHNSON.